| United States Patent Office | 3,627,544 |
|---|---|
| | Patented Dec. 14, 1971 |

1

3,627,544
PROCESS AND APPARATUS FOR THE ACCELERATED CONTINUOUS FERMENTATION AND RIPENING OF BEER WORTS
Gerhard Bosewitz, Falkensee, near Berlin, Rudolf Dickscheit, Berlin-Karolinenhof, and Helmut Ehlies and Peter Lietz, Berlin, Germany, assignors to Forschungsinstitut fur die Garungsindustrie, Enzymologie und technische Mikrobiologie, Berlin, Germany
Filed June 18, 1969, Ser. No. 834,447
Int. Cl. C12b *1/02*
U.S. Cl. 99—276                                    2 Claims

ABSTRACT OF THE DISCLOSURE

Beer worts are subjected to a process for their accelerated continuous fermentation and ripening which includes the following series of steps. Beer worts are initially purified in the best possible manner and cooled. They can be also freed from germs. Then they are saturated with oxygen and are enriched with a predetermined number of yeast cells by a propagation process carried out without pressure or only with small amounts of pressure in containers provided with wort-stirring devices. Then the worts are subjected to a continuous fermentation in a flow system consisting of several steps while being moved under pressure. At the end of the fermentation phase, the fermented and already substantially ripened beer is cooled, for example, in a young beer separator where yeast is removed. It is then possible to continue the further ripening process in a one-step flow line under pressure and a specific gas application so as to separate quickly the exchange substances of yeast cells produced during fermentation until they are all deposited and removed. The once started propagation can be carried out at will either continuously to keep constant the number of yeast cells, or can be discontinuous by returning the yeast only from the young beer separator or from specific containers.

Figure 1:
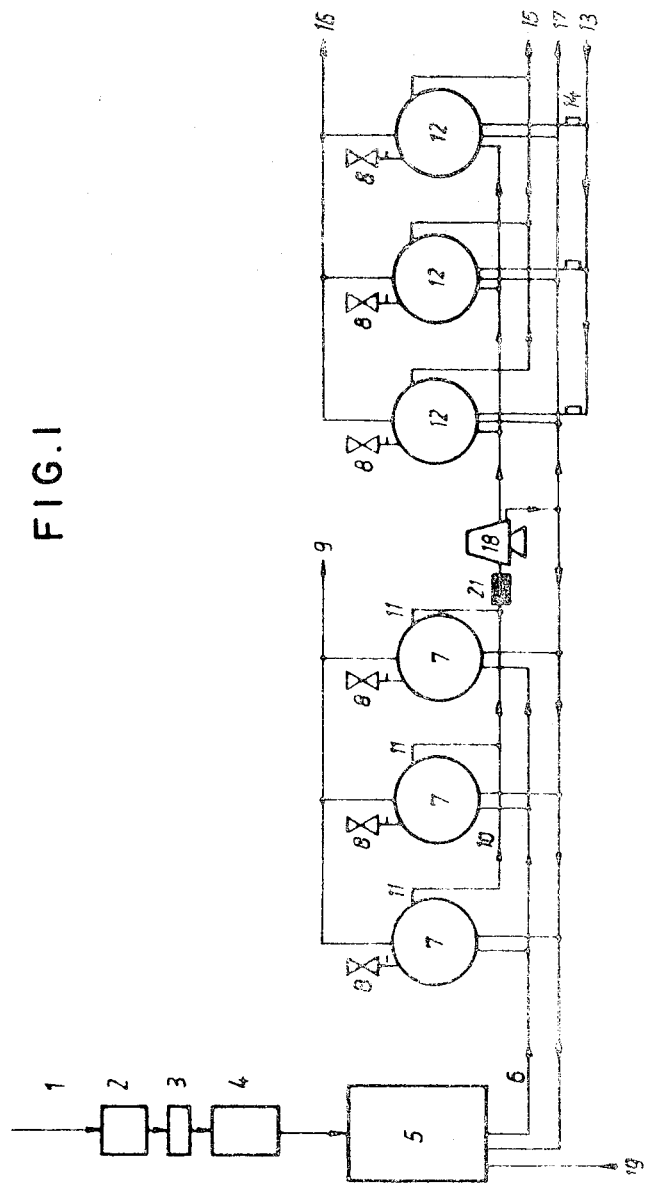

This invention relates to a process and apparatus for accelerated continuous fermentation and ripening of beer worts.

U.S. Pat. No. 3,524,402 contains the suggestion that beer worts may be enriched with yeast cells and then a quick fermentation can be carried out in aired fermentation tanks. The yeast increase is impeded in a further fermentation tank by the addition of $CO_2$ and the yeast is deposited in the last fermentation tank and can be used for renewed fermentation of beer worts. The young beer which is thus produced is subjected in further so-called ripening containers to an accelerated ripening by washing with $CO_2$.

Contrary to the teachings of the above patent, it was found that during continuous manufacture of beer it is advantageous to provide in front of the fermentation containers one or several propagation containers to regulate the yeast increase. The fermentation and ripening as well as the yeast treatment and yeast return are also carried out in a different manner in the present invention.

An object of the present invention is to treat fully purified, germ-freed and cooled worts in such manner that conditions are created for the best possible growth development for a yeast cell in a continuous production process. The propagation must be carried out in such manner that the multiplication and fermentation include in the following fermentation phase a guided separation of extracts as well as formation and separation of yeast exchange substances.

Other objects of the present invention will become apparent in the course of the following specification.

Thus in accordance with the present invention the flow line must be subjected to different treatments in the propagation, the fermentation section and the ripening complex. The mass of yeast deposited during the production must be again supplied in a corresponding amount to the yeast phase to secure continuity. The excess of yeast is available for a different use.

Special types of yeast can be introduced depending upon requirements.

In accordance with the present invention the well purified, cooled and germ-freed worts are enriched with oxygen or by a supply of air with oxygen. The gas or air treatment can be guidedly actuated by an amount-measuring instrument. The increase in yeast is carried out in propagation containers without pressure or at only a small pressure up to 0.3 p$\mu$ in oxygen-enriched worts which can have oxygen saturation up to 100%. For starting the propagation, specially added yeast is used, which is then returned when needed from the continuous fermentation process to maintain the continuity, or yeast can be returned continuously through a separate conduit.

As again distinguished from the above-mentioned patent, worts are supplied in several steps to the fermentation containers. The flow current through the containers is carried out during the fermentation phase in such manner that the yeast cells remain floating and are deposited only in the last phase. In order to accelerate the fermentation and ripening, their deposit can be prevented by gas blowing, stirring or by revolving devices. This provides the best possible way to extensively influence the deposit of exchange substances of yeast cells and to attain an effective fermentation and ripening.

If the fermentation section is divided, gas can be already applied in the second section of the fermentation, which will support the ripening phase of the ripening section already in the fermentation section.

The fermentation takes place under pressure of, for example, 0.8 p$\mu$. This pressure is created by the fermentation process itself and is maintained in that amount by the provision of safety armatures. A pipe union permitting an additional setting of the desired pressure is located below each safety armature for use if pressure for any reason is to be corrected.

The difference in temperature between the individual fermentation and ripening sections can amount, for example, up to 7° C. and therefore, a cooling device is provided in the conduit for the wort current which can be described already as young beer, as it leaves the fermentation section, the cooling device being adapted to the production capacity of the fermentation section. The further drop in temperature of the ripening beer up to, for example, 0.5° C., is carried out in the comparatively short time of ripening by an intensive cooling of beer subjected to ripening or of already ripened beer.

After completion of fermentation and ripening caused by the yeast, a young beer separator is provided behind the cooling apparatus for the deposit of yeast masses.

The return conduit for the yeast which serves at the same time for removing yeast excess can be made double and can be so arranged that only yeast from the young beer separator or from a predetermined number of containers is supplied as single seeds of yeast cells to the propagation container, while yeast from all other containers is removed in a different conduit for other treatments.

The gas supply in the ripening section serves to wash out the yeast exchange substances out of the fermented beer which has been also extensively ripened to obtain a quicker final ripening of the beer.

The technical and technically economical effects of the present invention consist in that a beer can be produced in the short time period of 7 to 10 days with comparatively small expenses, which does not require any subsequent storage and which qualitatively is at least equal to existing beers.

There is no separation any more into fermentation and storage cellars. Due to continuity of production, the expensive cellars are structurally diminished. The production means of existing conventional production sections are also greatly diminished. Due to the shortening of the operational time period, the operational work involved is also lessened. The automatization of this production and the effective mechanization reduce the cleaning and hygienic operations and also reduce the required number of workers.

The invention will appear more clearly from the following detailed description when taken in connection with the accompanying drawings, showing, by way of example only, the preferred embodiments of the inventive idea.

Figure 2:
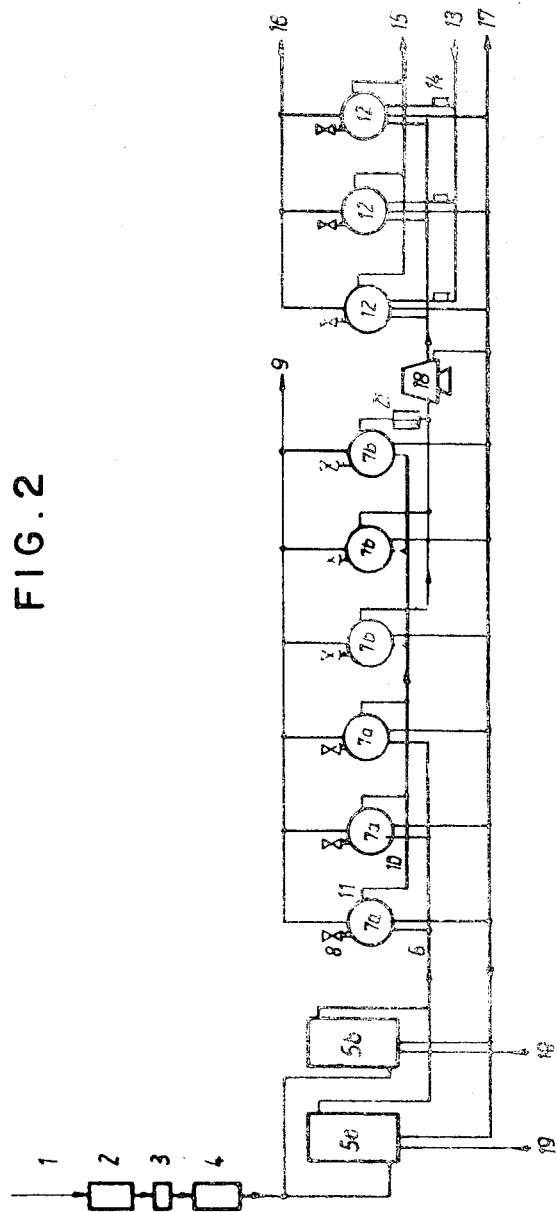
Figure 3:
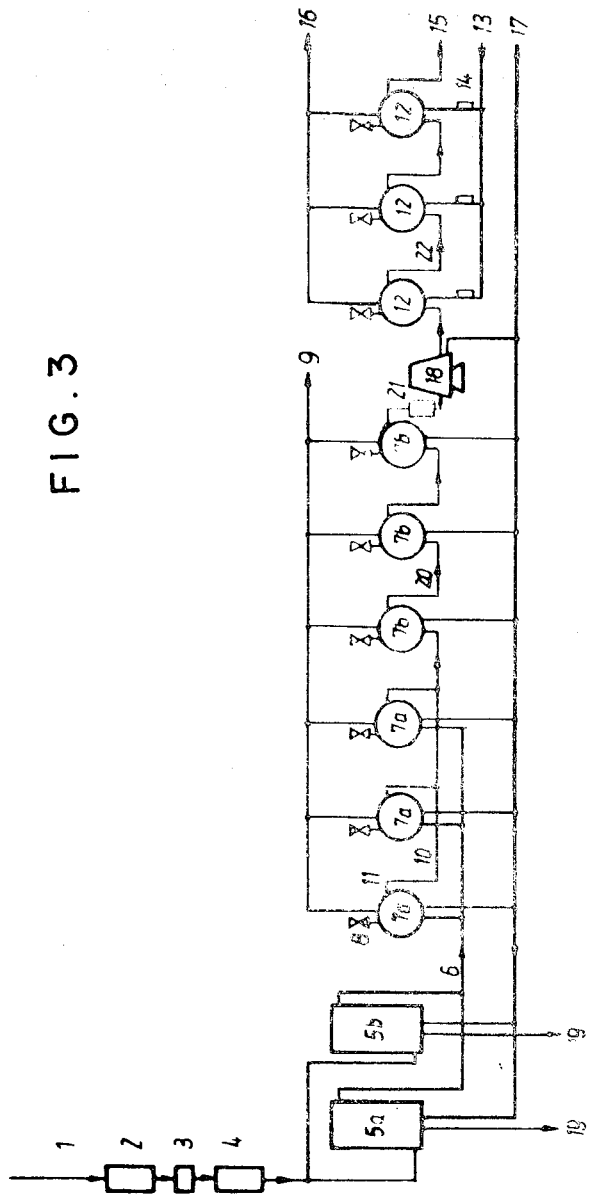

FIGS. 1, 2 and 3 of the drawings are diagrams illustrating three different examples of the process of the present invention.

EXAMPLE 1 (FIG. 1)

Worts 1 which have been purified to the greatest possible extent are freed from germs in a germ removing device 2 and are set, for example, to a temperature of 3° C. to 7° C. in a cooling device 3. Thereupon yeast is treated with oxygen in the device 4, whereby worts are saturated with oxygen to the extent of 80% to 100%.

Then the worts move through one or several propagation containers 5 which are provided with devices for stirring the worts and which serve to multiply the cells. The yeast mass enriched in this manner has, for example, 70 mio yeast cells per ml. wort.

After having been enriched with yeast cells, the wort current 6 is transmitted in several steps into fermentation containers 7 which are provided with safety armatures 8 and contain a safety valve, a manometer, a check valve and pressure reducing means. There is also provided a connection to the armature, which permits an increase in pressure in the container. The fermentation process is carried out in these containers at a temperature of, for example, 8° C. to 10° C. and a pressure of, for example, 0.8 p$\mu$. A conduit 9 for withdrawing carbonic acid makes certain the further use of the fermentation carbonic acid.

The outflow of the wort current is regulated by inflow and by pressure. No pressure reducing devices for the liquid are used. The level 11 of the containers amounts, for example, to 70% of the contents of the containers to secure a rising space for the chipping worts and a complete removal of $CO_2$. The extent of the filling can be regulated by a level indicator.

The current of beer which has been fermented and has been substantially ripened, is cooled in a cooling apparatus 21 after having left the fermentation containers. Then yeast is removed to a predetermined extent in a young beer separator 18, or without the separator. Then beer flows into ripening containers 12. The filling volume of the ripening containers is, for example, 80% of the full volume and is somewhat higher than the filling volume of the first-mentioned containers. For the ripening process, the containers can be arranged in columns, they can be connected one behind the other or they can be switched on individually. A regulated individual gas flow 13 or a column-like gas supply through a flow measuring device 14 at a pressure of, for example, 0.3 to 0.5 p$\mu$, can be used to wash out the exchange substances of the yeast cells and to complete the ripening process. Pressures can vary depending upon the geographical location of the plant.

The supply of gas depends upon the requirements of the ripening extent of the beer and can amount, for example, between 40 to 80 ml. $CO_2$/l. young beer. The required carbonic acid can be provided from the fermentation carbonic acid of the fermentation containers 7, which is removed through the conduit 9 for further uses. A gas discharging conduit 16 of the ripening containers can extend into the atmosphere depending upon existing operational conditions.

The ripening containers 12 are subjected to a regulated cooling process, whereby the fermented beer which is already ripened to a substantial extent, has a temperature of, for example, 3° C. at the entry into the ripening section. When it leaves the conditioning phase as fully ripened beer 15, it may have the temperature of, for example, 0.5° C. The ripeness of beer is indicated by the termination of chemical and bio-chemical processes and by the end of the process of washing out the exchange substances of the yeast cells.

The number of propagation containers 5, fermentation containers 7 and ripening containers 12 for the increase, fermentation and ripening, as well as conditioning, can vary in size and number depending upon the size of the plant. To start the flow, yeast is introduced into the propagation container at 19. To maintain a continuous production line, yeast is returned from the fermentation phase into the propagation containers depending upon the requirements of yeast increase in the propagation phase. The removal of excessive yeast for use elsewhere is carried out by the yeast conduit 17. Each container, including the young beer separator 18, is connected to one or several yeast carrying conduits 17 through three way cocks.

It is possible to eliminate the withdrawal of yeast out of ripening and conditioning containers 12 through the conduit 17 by yeast removal in the fermented and extensively ripened beer 10 by means of the young beer separator 18. Sediments of deposited yeast and of other substances can be easily removed by a periodic cleaning cycle of containers which can be switched off individually. The cleaning, maintenance and repair can be carried out by the withdrawal of containers used mainly for fermentation and propagation from the continuous operational production by switching them off and providing cross connections.

EXAMPLE 2 (FIG. 2)

This example is provided to indicate the wide scope of the present invention.

Supplementing the process of Example 1, the worts 1 receive the above-described enrichment with yeast cells in one or several propagation containers 5a and 5b, depending upon the size of the plant. The wort flow 6 is then supplied in several steps to a part of fermentation containers 7a used for fermentation purposes and subjected to pressure and then is supplied in one step to a further number of fermentation containers 7b also subjected to pressure. Thus the fermentation phase is divided into one section serving primarily for the reduction of extracts and a further fermentation section which already supports the ripening process in a flow continuing in one step with a small amount of extracts.

Safety armatures 8, conduit 9 for the withdrawal of fermentation carbonic acid, and conduit 17 for the yeast are arranged as in Example 1. There are no other changes of the process described therein.

EXAMPLE 3 (FIG. 3)

This example provides a further embodiment for the completion of the disclosure of the present invention.

Amplifying the process described in Example 2, the wort flow 10 leaving the first fermentation vessel 7a can be directed to flow through a number of other vessels, depending upon the size of the plant, and then can flow as the wort current 20 consecutively through the following fermentation containers 7b; then it flows through a cooler 21 and a young beer separator 18 for yeast removal, whereupon the beer current 22 flows consecutively through the conditioning containers 12.

As above stated, in this example as well, the removal of deposits or substances separated in the conditioning containers 12 through the yeast conduit 17, can be dispensed with.

To support the ripening phase, gas flows can be provided already in the second vertical section of fermentation, namely, the fermentation vessels 7b, which will influence the continuously flowing wort current 20.

We claim:

1. An apparatus for the accelerated continuous fermentation and ripening of beer worts, comprising a fermentation unit consisting of a plurality of interconnected containers divided into two sections, means supplying worts to the first section in one or several steps, the worts flowing in one step through the second section to form a fermented and substantially ripened beer, a cooling device for cooling said beer, a young beer separator connected with said cooling device for removing yeast from the beer, a plurality of ripening containers interconnected in series and connected with said young beer separator to provide a continuous flow of beer therethrough and regulatable means supplying gas to said ripening containers.

2. An apparatus in accordance with claim 1, comprising means supplying gas to worts flowing consecutively through the containers of the second section of the fermentation unit, and means switching off individually the ripening containers for cleaning purposes.

References Cited

UNITED STATES PATENTS

| | | | |
|---|---|---|---|
| 3,057,726 | 10/1962 | Shore | 99—52 |
| 3,062,656 | 11/1962 | Agabalianz | 99—276 X |
| 3,486,437 | 12/1969 | Bazhenov | 99—276 |

ROBERT W. JENKINS, Primary Examiner

U.S. Cl. X.R.

99—31